US006931596B2

(12) United States Patent
Gutta et al.

(10) Patent No.: US 6,931,596 B2
(45) Date of Patent: Aug. 16, 2005

(54) AUTOMATIC POSITIONING OF DISPLAY DEPENDING UPON THE VIEWER'S LOCATION

(75) Inventors: Srinivas Gutta, Buchanan, NY (US); Kaushal Kurapati, Yorktown Heights, NY (US); Antonio J. Colmenarez, Peekskill, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 497 days.

(21) Appl. No.: 09/800,219

(22) Filed: Mar. 5, 2001

(65) Prior Publication Data

US 2002/0149613 A1 Oct. 17, 2002

(51) Int. Cl.$^7$ ................................................ G06F 3/16
(52) U.S. Cl. ...................... 715/728; 715/863; 345/649
(58) Field of Search .................. 345/649, 863; 715/863, 728

(56) References Cited

U.S. PATENT DOCUMENTS

| | | | |
|---|---|---|---|
| 5,206,721 A | 4/1993 | Ashida et al. | ................. 358/85 |
| 5,250,888 A | * 10/1993 | Yu | ............................. 318/640 |
| 5,454,043 A | * 9/1995 | Freeman | ..................... 382/168 |
| 6,160,899 A | * 12/2000 | Lee et al. | .................... 382/103 |
| 6,176,782 B1 | * 1/2001 | Lyons et al. | ................... 463/36 |
| 6,348,928 B1 | * 2/2002 | Jeong | ......................... 345/649 |
| 6,437,794 B1 | * 8/2002 | Ohshima et al. | ............ 345/619 |
| 6,567,101 B1 | * 5/2003 | Thomas | ..................... 345/649 |

FOREIGN PATENT DOCUMENTS

| | | | |
|---|---|---|---|
| EP | 0702494 A2 | 3/1996 | ........... H04N/13/04 |
| EP | 0607000 B1 | 9/2000 | ........... H04N/13/04 |
| JP | 406141309 A | * 5/1994 | ............... 348/14.01 |
| JP | 6309067 | 6/1994 | .............. G06F/1/16 |
| WO | WO9911074 | 3/1999 | ........... H04N/13/04 |

OTHER PUBLICATIONS

U.S. Appl. No. 09/519,549, filed Mar. 6, 2000, Pending.
U.S. Appl. No. 09/912,685, filed Jul. 25, 2002, Pending.
Gutta, S., et al., *Hand Gesture Recognition Using Ensembles of Radial Basis Function (RBF) Networks and Decision Trees*, Int 1. Journal of Pattern Recognition and Artificial Intelligence, vol. 11, No. 8, (1997), pp. 845–872.
Gutta, S., et al. *Mixture of Experts for Classification of Gender, Ethnic Origin, and Pose of Human Faces*, IEEE Transactions on Neural Networks, vol. 11, No. 4, (Jul. 2000), pp. 948–960.

(Continued)

*Primary Examiner*—Raymond J. Bayerl
*Assistant Examiner*—Dennis G. Bonshock
(74) *Attorney, Agent, or Firm*—Gregory L. Thorne

(57) ABSTRACT

A system having a video display screen that provides video to a user. The position of the display screen is adjustable based upon the location of the user with respect to the display screen. The system includes at least one image capturing device trainable on a viewing region of the display screen and coupled to a control unit having image recognition software. The image recognition software identifies the user in an image generated by the image capturing device. The software of the control unit also generates at least one measurement of the position of the user based upon the detection of the user in the image.

2 Claims, 2 Drawing Sheets

OTHER PUBLICATIONS

McKenna, Stephen et al., *Tracking Faces*, Proceedings of the Second Int'l. Conference on Automatic Face and Gesture Recognition, Oct. 14–16, 1996, Killington, Vermont, pp. 271–276.

Abstract for Japanese Patent Appln. No. 04290019, Publication No. 06141309A, Published May 20, 1994.

Abstract for Japanese Patent Nppln. No. 62–287298, Publication No. 1–129590(A), Published May 22, 1989.

Gavrila, D.M., *Pedestrian Detection from a Moving Vehicle*, (Image Understanding Systems, DiamlerCrysler Research), Proceedings of the European Conference on Computer Vision, 2000.

Isard and Black, *Condensation Conditional Density Propagation for Visual Tracking*, (Oxford Dept. of Engineering Science), Intl. J. Computer Vision, vol. 29, No. 1, pp. 5–28, 1998.

Wren, et al., *Pfinder: Real–Time Tracking of the Human Body*, M.I.T. Media Laboratory Perceptual Computing Section Technical Report No. 353, published in IEEE Transactions on Pattern Analyis and Machine Intelligence, vol. 19, No. 7, pp. 780–785 (Jul. 1997).

* cited by examiner

AUTOMATIC POSITIONING OF DISPLAY DEPENDING UPON THE VIEWER'S LOCATION

FIELD OF THE INVENTION

The invention relates to displays, such as computer monitors, televisions and home theater systems. In particular, the invention relates to systems and methods for adjusting the position of the screen of such displays with respect to one or more viewers.

BACKGROUND OF THE INVENTION

Particular systems for adjusting the direction that a video display is oriented based on the position of a viewer are known. For example, the Abstract of Japanese Patent Application 04290019 (publication number 06141309) describes a system that utilizes two microphones that each sample the voice of a talking person. The system compares the samples from each microphone to determine which is larger. The system purportedly uses the comparison to orient a display in the direction of the person. Among other disadvantages, the system cannot precisely orient the display in the direction of the user based solely upon which microphone detects a larger speaking volume. In addition, the system will orient itself to a loud noise of a talking person or other noise source in the vicinity, for example, regardless of whether it is the actual viewer of the display, or regardless of whether the person desires the display to be re-oriented.

Another system for orienting a display in the direction of a viewer is described in U.S. application Ser. No. 5,250,888 to Yu. The Yu patent purports to use an array of photo detectors to detect the viewer's position relative to the display. By detecting which photo detector receives the maximum light signal from a remote wielded by the viewer, the viewer's relative position is calculated and a table on which the display is supported is adjusted so that the display faces in the direction of the user. Again, the array of photo detectors only gives an approximation of the location of the viewer and, in addition, the system cannot adjust to multiple viewers.

SUMMARY OF THE INVENTION

One obvious difficulty with the prior art systems is that they either require a user use a remote (as in the Yu patent) to adjust the position of the display. In addition, the Yu system only provides an approximate positioning based on a limited array of photo detectors. The microphone based adjustment system of the Abstract of Japanese Patent Application 04290019 provides an even cruder and even less discriminating adjustment.

Among other things, it is thus an object of the invention to provide a highly accurate system for automatically adjusting the orientation of the screen of a display so that it is facing a viewer. It is also an objective of the invention that the system automatically adjust to a particular viewer when that viewer is recognized as oriented to view the display. In addition, the system may automatically adjust to a median or average viewing position based on the positions of two or more persons that are recognized as viewers.

Accordingly, the invention provides a display system that can automatically adjust to the position of the viewer or user of the system, including a change in position of the user. In general, the invention comprises a display that displays video via a surface that is flat or modestly curved. This surface is typically a screen that is part of the display, such as a television. However, it also includes, for example, a home theater projection screen. The orientation of the display screen is adjustable. Where the display and screen are one unit, for example, the display may be mounted or supported by a table whose orientation may be adjusted in one or more degrees of freedom, along with a corresponding adjustment of the orientation of the screen. Where the display is a projection display, the screen and the projector may be mounted on a single structure whose orientation may be adjusted in one or more degrees of freedom. Alternatively, the screen and projector may have separate supports or mounts having adjustable orientation. Drivers that move the mounts or supports of the display (or components of the display system) typically comprise motors (such as stepper motors) or like electromechanical device (such as a piezo-electric driver).

The system includes at least one image-capturing device (such as a video camera) that is trainable on a viewing region and coupled to a processing section having image recognition software. The processing section uses the image recognition software to identify a user in an image generated by the image-capturing device. The software may be programmed to detect a particular viewer, such as the principle users of a PC or a television. Using data received from the image processing software, the processing section determines a measure of the orientation of the display screen such that it is facing the viewer. The software of the processing section provides corresponding output to the drivers that interface with the display screen and orient the screen such that it is facing the viewer.

In one particular case, after detecting the viewer in the image, the image processing software determines the pose of the viewer in the image. The pose is used to determine how the display screen should be oriented with respect to the viewer, and the processing section generates an output that causes the appropriate adjustment by the drivers so that the screen is facing the viewer.

As noted, the image recognition software of the processing section may detect the image of a particular viewer (whose image may be pre-programmed in the software) and provide the commensurate adjustment. Alternatively, the software may detect any person in the image and adjust the display screen according to the person. If there are more than one person, an average or best viewing position of the display screen with respect to the collection of viewers may be determined and the display screen may be so oriented.

As an alternative to recognizing the viewer's face, the image recognition software may recognize certain hand gestures known to the user and adjust the orientation of the display screen in accordance with the gestures. As another alternative, the system may have an audio capturing device (such as a microphone) and the processing section may use speech or voice recognition software. When certain commands are captured and recognized (such as "up", "down", "left" and "right"), the processing section may provide a corresponding command to the appropriate driver to move the display screen a predetermined amount in the commanded direction.

DETAILED DESCRIPTION

Figure 1:
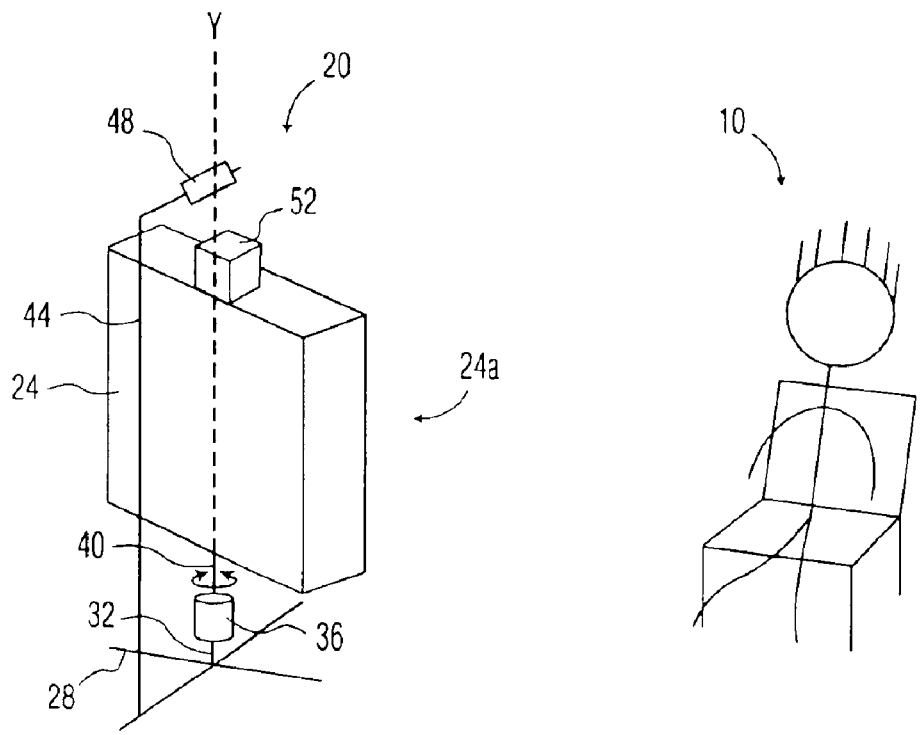
FIG. 1 is a perspective view of a display system for automatic adjustment of the orientation of the display screen in accordance with an embodiment of the invention.

Referring to FIG. 1, a user 10 is shown positioned in a viewing region of a system 20 comprising an embodiment of the invention. The system 20 is comprised of a display 24 having a display screen 24a that may be viewed by the user 10 (thus the user is in the "viewing region" of the system 20, as noted above). The display 24 is supported by a base 28, which includes lower and upper vertical supports 32, 40 having a stepper motor 36 interposed therebetween. The base 28, lower vertical support 32 and stepper motor 36 are in a fixed relationship relative to each other. Upper vertical support 40 may be rotated along its axis by the drive shaft of stepper motor 36 (as indicated by the arrow shown in FIG. 1 adjacent the upper vertical support 40). Thus, as described further below, the display may be rotated by the stepper motor 36 about the axis Y (defined by vertical support 40) to orient the display screen 24a so that it faces the user 10.

The system 20 is also comprised of a control unit 52, shown in FIG. 1 positioned atop the display 24. Of course, the control unit 52 may be positioned elsewhere or may be incorporated within the display 24 itself. The system 20 is also comprised of a camera 48 mounted in fixed relationship to the base 28 via a separate vertical support 44. The vertical support 44 is positioned so that the camera 48 does not interfere with the movement of the display 24. The control unit 52, stepper motor 36 and camera 48 are all electrically connected with electrical wires and connectors (not shown in FIG. 1), for example, via an electrical harness that runs down the back of display 24 and adjacent to (or internal to) the base 28 and vertical supports 32, 40, 44.

The display 24 of the system 20 of FIG. 1 includes electrical components that produce visual output from display screen 24a and corresponding audio output from associated speakers (not shown). The audio and video processing for the display 24 may occur in the control unit 52 or a separate control unit within the display (or elsewhere). The processing components for such audio and video are known and available in various commercial formats. Since they are not central to the operation of the invention, the details will be omitted from the discussion, except to the extent necessary to describe the invention.

Figure 1A:
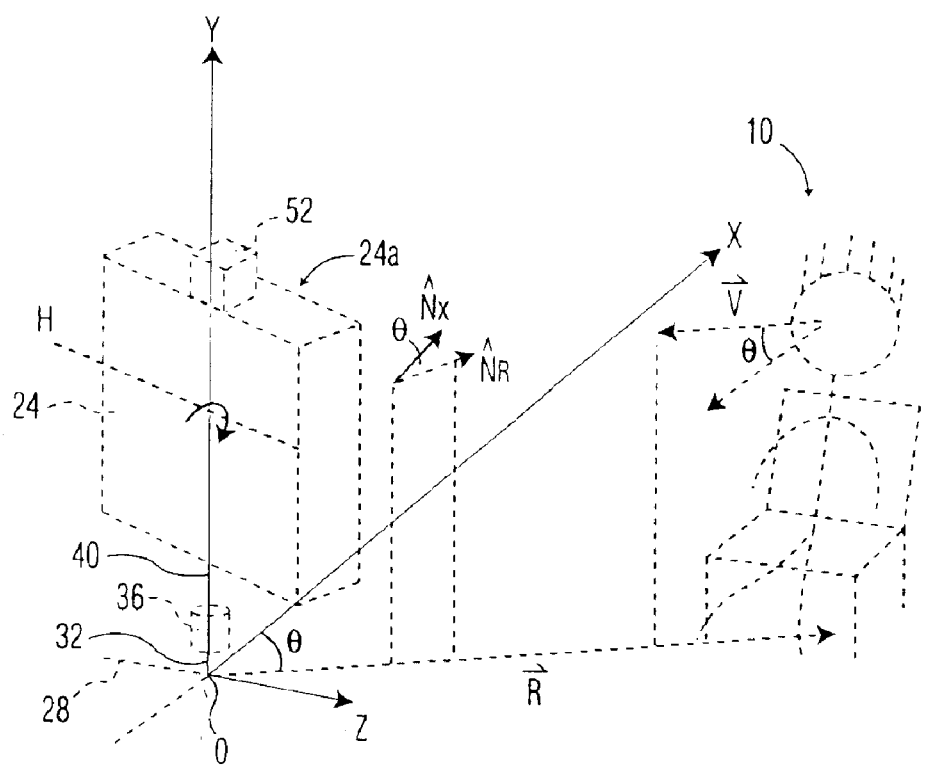
FIG. 1a is rendition of the display system of FIG. 1 that describes a reference coordinate system and salient geometric features used in the automatic adjustment.

FIG. 1a shows the display 24 and user 10 of FIG. 1 in phantom in order to describe the positioning and movement of the display 24 by the system 20. As seen in FIG. 1a, a reference coordinate system O lies at the midpoint of base 28, axis Y lies in the vertical position about which the display is rotated by stepper motor 36 (as described above with respect to FIG. 1) and axes X and Y define the plane of the floor. The initial position of the display 24 is with respect to a reference direction, such as axis X; thus, when the display is in the initial position, the normal vector to the display screen 24a (shown as vector $N_x$ in FIG. 1a) is aligned with axis X. The user 10 is shown positioned at an angle θ with respect to the X axis in the plane of the floor (XZ plane). Thus, the position of the user 10 in the plane of the floor is defined in FIG. 1a by vector R.

Referring to FIG. 1 in addition to FIG. 1a, where a particular angle of rotation of the display about axis Y is known to or determined by the control unit 52, the control unit 52 is programmed to output corresponding control signals to the stepper motor 36. The control signals cause the stepper motor 36 (and, consequently, the display 24 by virtue of its attachment to vertical support 40) to rotate its drive shaft through the particular angle. The drive shaft of the stepper motor (which is also parallel to axis Y) has a reference position where the normal vector $N_x$ of the display screen is parallel with axis X as described above. Control unit 52 keeps track of the rotation of the drive shaft and the display with respect to axis X, for example, by keeping track of the rotation of the drive shaft of stepper motor 36 due to the control signals sent by the control unit 52, or by a feedback signal to the control unit 52 of the rotation position.

When the drive shaft and display are rotated with respect to axis Y, the normal vector to the display screen likewise rotates about axis Y through the same angle. Thus, referring again to FIG. 1a, when the control unit 52 receives or otherwise determines the angular position θ of the user 10, it sends the appropriate control signals to the stepper motor 36 so that the motor rotates its drive shaft from its reference position to lie at an angle θ with respect to the X axis. This consequently rotates the display and the normal vector to the display screen by an angle θ with respect to the X axis, as shown by normal vector $N_R$ in FIG. 1a. Thus, the normal vector $N_R$ of the display screen is rotated parallel to the vector R, and the display screen 24a is pointed directly at user 10. (That is, the plane of the display screen 24a is rotated so that it is normal to the vector V at which the viewer 10 views the screen, which is parallel to vector R.) If the display screen 24a is not initially oriented so that its normal vector lies along the X axis, then the control unit 52 (which keeps track of the orientation of the display) rotates the display 24 from its other initial position so that the normal vector to the display screen lies at angle θ with respect to the X axis.

In the description immediately above, the angular position θ of the user 10 was assumed to be known or otherwise determined by the control unit 52, and the display 24 was rotated so that the display screen 24a was facing the user 10. In a simple embodiment, the control unit 52 may manually receive and store the position of the user 10 in the common reference system described with respect to FIG. 1a. The control unit 52 may receive and store the X and Z coordinates of the user 10 and calculate the angle θ, or else the control unit 52 may receive and store the angle θ. (Of course, the reference coordinate system in general may be located in a position other than that shown in FIG. 1a. In that case, the control unit 52 may first translate the coordinates of the user (such as the one shown in FIG. 1a) in order to determine how much to rotate the display.)

The system 20 of FIG. 1 can also automatically identify the user and the user's angular position in the reference coordinate system. Once the user's position is automatically determined by the system, as described in more detail below, the control unit 52 rotates the display to face the user, as previously described.

Figure 2:
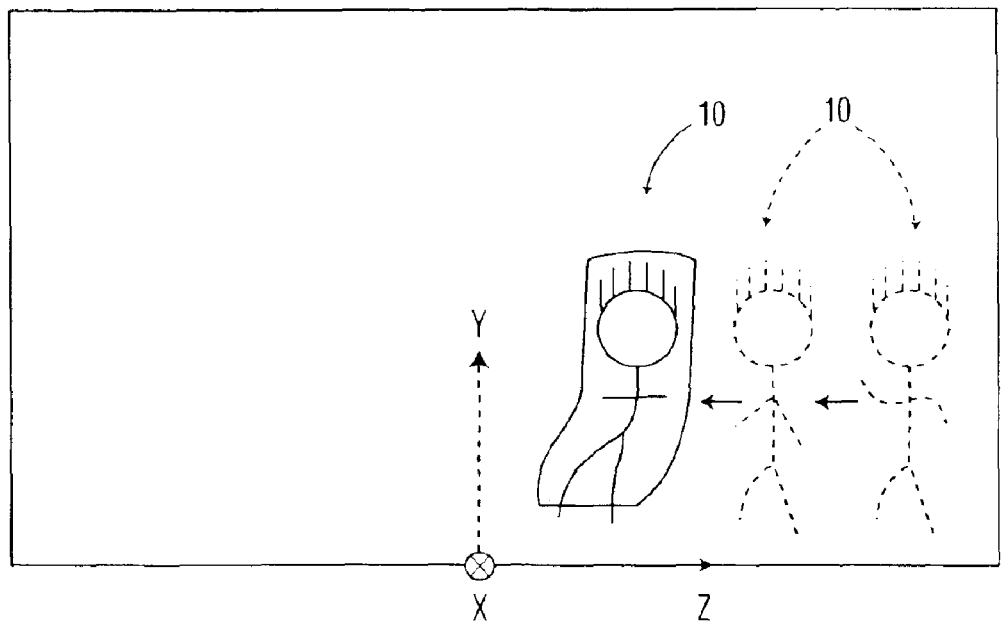
FIG. 2 is a representation of the image captured by the camera in FIG. 1.

In order to automatically detect the presence and, if present, the location of the user 10 in FIG. 1, the system 20 relies on images captured by camera 48 and processed by control unit 52. As noted above, camera 48 is positioned above display 24 and directed toward the normal viewing area of the display screen 24a, for example, such that the central axis of the camera lens is parallel to axis X. The images of FIG. 2 are transmitted to control unit 52, where it is processed using, for example, known image recognition software loaded therein. An image recognition algorithm may be used to recognize the contours of a human body, such as the user 10. Alternatively, image recognition software may be used that recognizes faces or may be programmed to recognize a particular face or faces, such as the face of user 10. In particular, known image recognition techniques may be programmed to identify the face of a user in a relatively static position (such as positioned in the chair of FIG. 2). Based on the detected image, the control unit may also determine the angle about the axis Y through which the display must be rotated in order to face the user. For example, the image recognition software may also identify the angle by further detecting the pose or angular tilt of the user's face. Alternatively, software of the control unit may use the position of the user's face in the image to determine the angle using geometric considerations. Once the angle of rotation about Y is determined (for example, the angle θ in FIG. 1), the display is rotated by the control unit 52 sending control signals to the stepper motor 36, as described above.

Image recognition software is loaded in control unit 52 and is used by a processor therein to process the images received from the camera 48. Depending on the camera, the images may be a series of discrete images or video frames. The images as processed by the control unit 52 may be, for example, the intensity data captured by an array of pixels in a CCD array of a digital camera or digital video camera and transferred to the control unit 52. The components, including memory, of the control unit 52 used for image recognition may be separate or may be shared with the other functions of the display 24.

The solid representation of the user 10 in FIG. 2 depicts an image of the user 10 captured by the camera 48 when in the position shown in FIG. 1. As noted, a series of images may be captured by camera 48 and transferred to and processed by the control unit 52. Most typically, a user 10 viewing the display screen will be relatively stationary, for example, sitting in a recliner or on a couch, as shown by the solid representation of FIG. 2. In that case, the corresponding series of images captured and processed will all look approximately like the solid rendition of the user 10 shown in FIG. 2.

However, when the user first moves into the field of view of the camera 48, the user will be in motion. For example, as represented in phantom in FIG. 2, successive images will initially show the user 10 walking into the field of view of the camera 48 (from the right in this case) and sitting down in the chair. Although the user 10 may then stay stationary for an extended period of time (with little or no movement between successive images captured and processed), the user may periodically move, for example from a recliner to a couch.

In one embodiment, the image processing software of the control unit 52 uses the series of images received to first detect the presence of a user 10 in the field of view of the camera 48. As just noted, when the user 10 first appears in the field of view, he will typically be in motion, for example, moving toward a chair as represented in phantom in FIG. 2. The image processing software thus initially compares successive images to detect and track an object that is in motion. In a known technique of such detection and tracking, for example, values of the function S(x,y,t) are calculated for each pixel (x,y) in the image array for an image, each successive image being designated by time t:

$$S(x, y, t) = \frac{\partial^2 G(t)}{\partial t^2} * I(x, y, t)$$

where G(t) is a Gaussian function and I(x,y,t) is the intensity of each pixel in image t. Movement of an edge in the image is identified by a temporal zero-crossing in S(x,y,t). Such zero crossings will be clustered in an image and the cluster of such moving edges will provide the contour of the body in motion.

The clusters are tracked in successive images based on their position, motion and shape. After a cluster is tracked for a small number of successive frames, it may be modeled, for example, as having a constant height and width (a "bounding box") and the repeated appearance of the bounded box in successive images may be monitored and quantified (through a persistence parameter, for example). If the moving body in the image is assumed to be person, then the location of the head may be estimated by the software to be at the top of the bounded box for the moving body.

In this manner, the control unit 52 may detect and track a user that moves into the field of view of the camera 48 and, in particular may detect and track the approximate location of the user's head. The above-described detection and tracking technique is described in more detail in "Tracking Faces" by McKenna and Gong, Proceedings of the Second International Conference on Automatic Face and Gesture Recognition, Killington, Vt., Oct. 14–16, 1996, pp. 271–276, the contents of which are hereby incorporated by reference. (Section 2 of the aforementioned paper describes tracking of multiple motions.)

Once the user becomes stationary, for example, when the user 10 sits in the chair as shown in FIGS. 1 and 2, the movement of the body (and the head) will be relatively stationary, as noted above. Thus, the persistence parameter will decrease. However, when the persistence parameter decreases below a particular threshold (indicating that the detected body has become stationary), the approximate location of the user's head has been determined to the control unit 52 from the detection and tracking routine. Thus, the control unit 52 may initiate a separate or supplementary technique of face recognition that focuses on that portion of the subsequent images received from the camera 48.

Thus, the control unit 52 may identify a static face in an image using known techniques that apply simple shape information (for example, an ellipse fitting or eigen-silhouettes) to conform to the contour in the image. Other structure of the face may be used in the identification (such as the nose, eyes, etc.), the symmetry of the face and typical skin tones. A more complex modeling technique uses photometric representations that model faces as points in large multi-dimensional hyperspaces, where the spatial arrangement of facial features are encoded within a holistic representation of the internal structure of the face. Face detection is achieved by classifying patches in the image as either "face" or "non-face" vectors, for example, by determining a probability density estimate by comparing the patches with models of faces for a particular sub-space of the image hyperspace.

Face detection may alternatively be achieved by training a neural network supported within the control unit 52 to detect frontal or near-frontal views. The network may be trained using many face images. The training images are scaled and masked to focus, for example, on a standard oval portion centered on the face images. A number of known techniques for equalizing the light intensity of the training images may be applied. The training may be expanded by adjusting the scale of the training face images and the rotation of the face images (thus training the network to accommodate the pose of the image). The training may also involve back-propagation of false-positive non-face patterns.

The control unit 52 may provide the portion estimated to correspond to the head (as identified in the motion detection and tracking technique described above) from the (formerly) moving images to such a trained neural network routine in the control unit 52. The neural network processes the image portion and determines whether it is a face image based on its image training.

As described above, the face detection routine (neural network or other) may be used on a relatively stationary image. A positive face detection by the neural network (or other face detection technique) may also be used in conjunction with the detection and tracking routine of the control unit 52 in order to support the tracking of a moving body. Various face detection techniques are known and the neural network technique is described in more detail in the aforementioned "Tracking Faces" paper. Additional details of face detection (as well as detection of other facial sub-classifications, such as gender, ethnicity and pose) using a neural network is described in "Mixture of Experts for Classification of Gender, Ethnic Origin and Pose of Human Faces" by Gutta, Huang, Jonathon and Wechsler, IEEE Transactions on Neural Networks, vol. 11, no. 4, pp. 948–960 (July 2000), the contents of which are hereby incorporated by reference and referred to below as the "Mixture of Experts" paper.

As noted, the neural network routine (or other face detection technique) may be expanded to include pose classification that estimates the pose of the detected face using a set of representative poses. The Mixture of Experts paper provides a detailed explanation of a neural network routine that incorporates pose classification. For a user looking at a display such as that shown in FIG. 1, the face detected in the image of camera 48 will have a pose associated with it because of the angular displacement of the user with respect to the optic axis of the camera. Thus, for each representative pose stored in the control unit 52, the control unit 52 may also have stored an associated angle that reflects the angular displacement of the user 10. Referring back to FIG. 1a, the optic axis of camera 48 is aligned with reference axis X; thus, the angle corresponding to the detected pose of user 10 will equal the angle θ. Accordingly, after the control unit 52 detects the pose of user 10 from the images, and the angle corresponding to the pose is also retrieved from a memory in the control unit 52 (which will be equal to the angle θ in FIG. 1), the control unit 52 sends the appropriate signals to the stepper motor 36 to rotate the display 24 to angle θ, as described above. The display screen 24a is thus automatically rotated to face the user 10 based on the detected face and pose.

The above described exemplary embodiment of automatic image (face) detection by the control unit 52 relies on an image detection that comprises tracking a moving body and face detection, which includes pose detection. In a typical scenario, the user 10 will enter the room and sit down for a relatively longer period to watch the display screen, such as a TV. In general, the display will not be moved until a user is detected as being stationary for a threshold period of time, in order to avoid moving the display as the user walks around the room. Thus, the control unit 52 may be programmed to detect and track a moving body (also identifying an estimated region of the image corresponding to the head of the body). Once the body is determined to remain in a relatively stationary position for a threshold period, the face and pose detection routine may be applied to the estimated region to verify that it is a face and, if so, the corresponding pose. Then the angle corresponding to the pose is used by the control unit 52 to rotate the display 24 so that it faces the (now stationary) user 10. If the user 10 again moves, the motion is tracked and, if the user again becomes stationary for a threshold period of time, the display is re-adjusted based on the newly determined pose and corresponding angle.

As noted above, the face detection routine may be used to supplement the detection and tracking of the moving body, for example, by checking to see whether the estimated region of the body is actually a face while the body is still in motion. As noted, however, the display will generally not be moved until the user 10 becomes relatively stationary, although in some applications the display may be rotated to track the movement of the user. As also noted above, the control unit 52 keeps track of the amount of rotation of the display 24 from a reference position (e.g., where $N_x$ lies along the X axis). Where the display has previously been rotated from this initial position, the control unit 52 takes the prior rotation into account when rotating to a different angle that corresponds to a detected pose. In addition, the face and pose detection routine described above may be applied directly to a series of images, without the detection and tracking routine. This requires processing of the entire image by the neural network (or other image detection processing techniques), at least initially. Once a face image is detected, that portion of successive images may be focused on by the processing.

In addition, the image recognition software may be programmed to recognize particular faces, thus only adjusting the display to those faces when recognized. The particular faces may be family members or those that use a particular computer display. In the neural network technique of face recognition, the network may be trained using images of those particular users. Faces of other persons may be used in the training as negative matches (for example, false-positive indications). The image detection software may also detect multiple users (viewers) in the images received from the camera 48. In that case, the detection software may determine a median viewing position (for example, based on a spatial average of the positions of the viewers, or a weighted average that takes particular recognized viewers into account) in the image and then adjust the display to face that position. The control unit 52 may determine the angular direction of the average position by extrapolating from the angle associated with the pose of the nearest viewer, for example, or by determining the angular position of the average position itself by using the geometric determination described immediately below.

In addition, the software of the control unit 52 may store the detected stationary positions (such as the angular positions) of a user or users over time. Where a position (or positions) of a user is found by the control unit 52 to be repeated over time, then the control unit may determine that the position is a default position. For example, the control unit 52 may determine that an angle is a default position where the user is detected at that angle (or a small range of angles centered about an angle) a threshold number of times over a certain number of detections. The default position or positions may be used by the control unit 52 to focus the image recognition processing on corresponding portions of a received image to help identify a user in the image. Thus, the default position(s) may be used by the control unit 52 to supplement the image detecting and tracking routine, described above. If the detecting and tracking routine is not used, then the default position(s) may give the software a starting point in the received images to apply the face recognition routine described above.

In addition, for a default position that is detected frequently, the control unit 52 may adjust the reference position of the drive shaft of the stepper motor 26 so that the normal vector of the display screen 24a lies at that angle. Thus, referring to FIG. 1a, if the position of the user 10 is determined to frequently reside at angle θ, then the control unit 52 may re-calibrate so that the reference position is when the normal vector ($N_R$) lies along R. In that case, the system may also have a second stepper motor that is controlled by the control unit 52 to rotate the camera 48 so that its optic axis is parallel to R. If the camera 48 is so rotated, the angular position of a user detected by the control unit 52 from the images received by the camera will correspond to the re-adjusted reference position of the display 24. If, however, the optic axis of the camera 48 cannot be moved with respect to the X axis, then the control unit 52 will have to transform the detected angular position of the user (with respect to the X axis) to the new reference position of the display 24 (along R) before rotating the display 24 to the user's detected position.

Figure 2A:
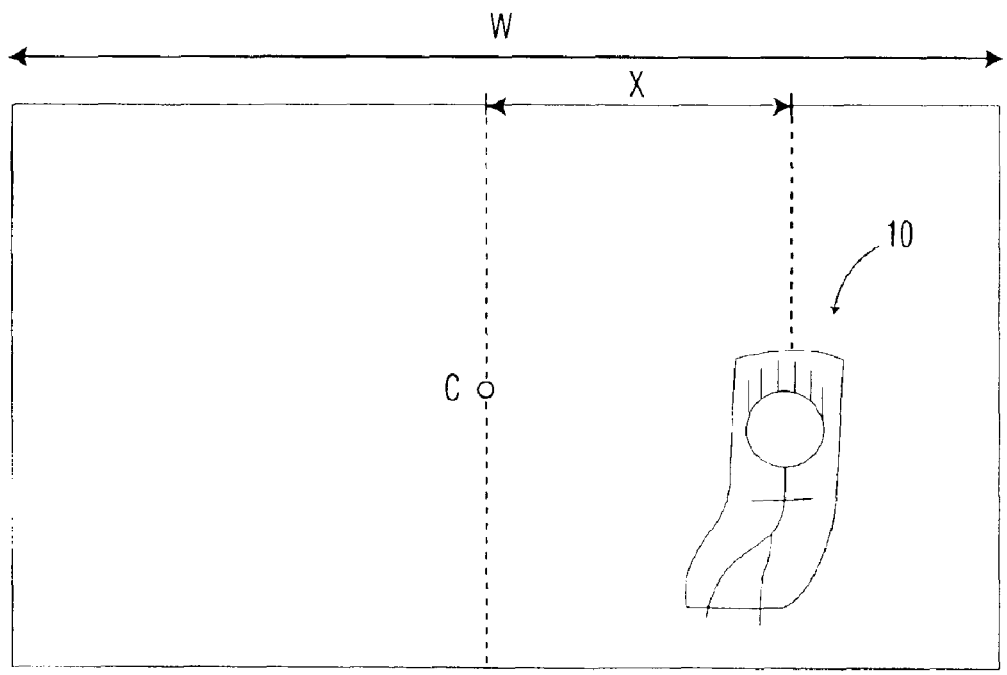
FIG. 2a is a second representation as in FIG. 2, including representation of parameters used by the automatic adjustment in a modified embodiment of the invention.

In an alternative embodiment, the detection of the pose of the detected user is replaced with a geometric determination of the angle θ of the user from the images of the user 10 captured by camera 48. The image captured by the camera 48 is transferred to the processing unit 52 that includes image recognition software that detects the contour of a human body, a particular face, etc., as described in the embodiment above. Thus, the software may include the motion detecting and processing routine and the neural network face recognition routine as described above, or an alternative known face recognition processing. The location of the detected body or face in the image is used by the control unit to determine the angle θ corresponding to the position of the user 10 in the reference coordinate system of FIG. 1. For example, referring to FIG. 2a, a first order determination of the angle θ is:

$$\theta=(x/W)(\psi)$$

where x is the horizontal image distance measured by the control unit 52 from the center C of the image, W is the total horizontal width of the image determined by (or preprogrammed in) the control unit 52, and the $\psi$ is the field of view, or, equivalently, the angular width of the scene, as fixed by the camera, which is programmed into the control unit 52. As noted, once the angle θ is determined, the control unit 52 sends control signals to the stepper motor 36 so that the display 24 is rotated by an angle θ and is thus facing the user 10.

The system of FIG. 1 may be adapted to movement of the face of the display in three dimensions, that is, so that the display also rotates about the axis H in FIG. 1a. The support for the display can be readily adapted to allow rotation along both the Y and H axes using a gimbaled support, for example, and have separate stepper motors for rotating. The image detection and processing software, such as that described above, may be adapted to also detect the required angle of rotation about axis H. Thus, for a user looking at a display such as that shown in FIG. 1, the face detected in the image of camera 48 will also have a pose associated with it because the face of the user may be displaced up or down with respect to a face positioned directly in front of the camera. Thus, each representative pose stored in the control unit 52 may have a second corresponding angle reflecting the angular displacement above or below the optic axis of the camera 48. When the representative pose is determined, the corresponding second angle is used by the control unit 52 to control the second stepper motor to rotate the display about axis H to an angle equal to the second angle. The first angle associated with the representative pose is used by the control unit to effect a rotation of the display about Y (i.e., θ) as described above.

Although the above embodiments have focused on a system where the display and the display screen are an integrated unit, the invention may be readily adapted to display systems where the display screen is separate from the other elements of the display system, such as a home theater system. In such cases, movement of the projection components of the display are correlated to movement of the display screen. The projection components and display screen may have a common support structure and stepper motor (or other driver) that moves them in as a single unit to adjust to the user. Alternatively, the projection components and display screen may have separate support structures and separate stepper motors (or other drivers) that move in tandem to adjust to the user based on control signals sent to each motor by the control unit 52.

In another alternative embodiment, the control unit 52 may be programmed with image detection software that recognizes hand gestures. Techniques of hand gesture recognition are known and described, for example, in "Hand Gesture Recognition Using Ensembles Of Radial Basis Function (RBF) Networks And Decision Trees" by Gutta, Imam and Wechsler, International Journal of Pattern Recognition and Artificial Intelligence, vol. 11, no. 6, pp. 845–872 (1997), the contents of which are hereby incorporated by reference. The control unit 52 of FIG. 1 may include such image recognition software for hand gestures, where certain hand gestures are commands to rotate the display in various directions. The images of the user 10 are again captured by the camera 48 and sent to the control unit 52 for image recognition analysis. If the control unit 52 detects a hand gesture of the user 10 that corresponds to a predetermined command for movement of the display 24, the control unit 52 transmits appropriate control signals to the stepper motor 36 to move the display 24 accordingly. For example, a detected image of a flat hand pointing in a horizontal direction captured by the camera 48 and recognized in the control unit 52 may indicate to rotate the display in the direction the hand is pointing. The control unit 52 may send a series of control signals to the stepper motor 36, each signal causing the display to move by 2% in the appropriate direction. When the control unit 52 determines that the hand gesture in the images has been withdrawn by the user 10, the rotation is halted. The user knows the hand signals and may thus control the movement of the display in the desired amount.

In addition, a particular hand gesture may be set to correspond to a particular angular position of the display screen. The gesture may be selected by the user from a menu on the display screen, for example, when the display 24 in the desired position. The control unit 52 then correlates the selected hand gesture to the angular position and, when the gesture is later detected, rotates the display to the position. Other gestures may correspond to other viewing positions. Other methods of setting the angle for a particular hand gesture in the control unit may be used.

In another alternative embodiment, the camera 48 of FIG. 1 is replaced with an audio pickup, such as a microphone. The control unit 52 includes speech recognition software that recognizes particular command words transmitted from the microphone, such as "rotate left" and "rotate right". When such a command is recognized, the control unit 52 causes the display to rotate a predetermined amount (such as 2%) about the Y axis in a particular direction. The user 10 may repeat the command to continue the movement in the same direction, another command corresponding to the reverse direction of rotation, or stop the movement when the angle is adjusted to his liking. Alternatively, once receiving a movement initiating command, such as "rotate left", the control unit may continue rotating the display in the commanded direction until a terminating command (such as "stop") is received, or a maximum angular displacement range of the display is reached.

Once the display 24 is positioned to face a frequent viewing position of a user, the user may also give a default setting command (such as "set default position A") that the speech recognition software recognizes. The control unit 52 uses the default setting command to relate a user voice command with the angular position of the display. When the speech recognition routine subsequently recognizes the related user command (such as "move to position A"), the control unit rotates the display to that angle. The default position (or multiple default positions, such as position B, C, etc) may be set in the control unit 52 for particular voice commands in other ways, for example, using an on-screen menu.

In addition, in both the hand gesture and speech recognition cases, the control unit 52 may adjust the reference position of the display 24 based upon a frequently detected user position, as described for the image detection case above.

Various other methods of detecting and tracking active contours such as the human body have been developed, which may be adapted to the invention in manners analogous to that described above. For example, a "person finder" that finds and follows people's bodies (or head or hands, for example) in a video image is described in "Pfinder: Real-Time Tracking Of the Human Body" by Wren et al., M.I.T. Media Laboratory Perceptual Computing Section Technical Report No. 353, published in IEEE Transactions on Pattern Analysis and Machine Intelligence, vol. 19, no. 7, pp 780–85 (July 1997), the contents of which are hereby incorporated by reference. Detection of a person (a pedestrian) within an image using a template matching approach is described in "Pedestrian Detection From A Moving Vehicle" by D. M. Gavrila (Image Understanding Systems, Daimler Chrysler Research), Proceedings of the European Conference on Computer Vision, 2000 (available at www.gravila.net), the contents of which are hereby incorporated by reference. Use of a statistical sampling algorithm for detection of a static object in an image and a stochastical model for detection of object motion is described in "Condensation—Conditional Density Propagation For Visual Tracking" by Isard and Black (Oxford Univ. Dept. of Engineering Science), Int. J. Computer Vision, vol. 29, 1998 (available at www.dai.ed.ac.uk/CVonline/LOCAL COPIES/ISARD1/condensation.html, along with the "Condensation" source code), the contents of which are hereby incorporated by reference. Software that can recognize faces in images (including digital images) is commercially available, such as the "FaceIt" software sold by Visionics and described at www.faceit.com.

Although illustrative embodiments of the present invention have been described herein with reference to the accompanying drawings, it is to be understood that the invention is not limited to those precise embodiments, but rather it is intended that the scope of the invention is as defined by the scope of the appended claims.

What is claimed is:

1. A system having a video display screen that provides video to a user, the system comprising at least one audio capturing device that captures audio input from a viewing region of the display screen and coupled to a control unit having speech recognition software that identifies one or more audio commands spoken by a user in the viewing region, the control unit invoking an adjustment of the orientation of the display screen based upon the identified audio commands received from user.

2. The system of claim 1, wherein each of the one or more audio commands are correlated to movement of the display screen in a pre-determined direction.

* * * * *